US012562544B2

(12) United States Patent (10) Patent No.: US 12,562,544 B2
Neog et al. (45) Date of Patent: Feb. 24, 2026

(54) AUTOMATIC CONFIGURATION OF PUMP ATTRIBUTES OF A RAMAN AMPLIFIER TO ACHIEVE A DESIRED GAIN PROFILE

(71) Applicant: Infinera Corp., San Jose, CA (US)

(72) Inventors: Ankur Neog, Bangalore (IN); Zhong Pan, Naperville, IL (US); Baranidhar Ramanathan, Karnataka (IN)

(73) Assignee: Infinera Corp.

( * ) Notice: Subject to any disclaimer, the term of this patent is extended or adjusted under 35 U.S.C. 154(b) by 925 days.

(21) Appl. No.: 17/841,233

(22) Filed: Jun. 15, 2022

(65) Prior Publication Data

US 2022/0416495 A1 Dec. 29, 2022

Related U.S. Application Data

(60) Provisional application No. 63/216,425, filed on Jun. 29, 2021.

(51) Int. Cl.
*H01S 3/00* (2006.01)
*G05B 13/02* (2006.01)
*H01S 3/091* (2006.01)
*H01S 3/10* (2006.01)
*H01S 3/30* (2006.01)

(52) U.S. Cl.
CPC .......... *H01S 3/0912* (2013.01); *G05B 13/027* (2013.01); *H01S 3/1001* (2019.08); *H01S 3/30* (2013.01)

(58) Field of Classification Search
CPC ........ H01S 3/0912; H01S 3/1001; H01S 3/30; G05B 13/027
See application file for complete search history.

(56) References Cited

U.S. PATENT DOCUMENTS

| | | | |
|---|---|---|---|
| 6,907,051 B1 * | 6/2005 | Farmer | H01S 3/06754 372/38.1 |
| 2015/0085350 A1 * | 3/2015 | Griseri | H04B 10/2916 359/334 |
| 2021/0226408 A1 * | 7/2021 | Boertjes | H04B 10/0797 |

FOREIGN PATENT DOCUMENTS

CN 102332954 A * 1/2021 ............. H04B 10/17

* cited by examiner

*Primary Examiner* — Mark Hellner

(57) ABSTRACT

Disclosed herein are methods and systems for automatically configuring a raman amplifier. One exemplary system may be provided with the raman amplifier, a user device, and a network administration device. A processor of the network administration device executes instructions that cause the network administration device to generate a machine learning model using machine learning techniques and deploy the machine learning model to a controller of the raman amplifier. When a desired gain profile is communicated from the user device to the controller of the raman amplifier, instructions stored in non-transitory computer readable memory cause a processor of the controller to automatically assess the desired gain profile using the machine learning model to determine raman pump configurations for each of a plurality of raman pumps of the raman amplifier and send the determined raman pump configurations to each of the plurality of raman pumps of the raman amplifier.

9 Claims, 6 Drawing Sheets

400

AUTOMATIC CONFIGURATION OF PUMP ATTRIBUTES OF A RAMAN AMPLIFIER TO ACHIEVE A DESIRED GAIN PROFILE

CROSS REFERENCE TO RELATED APPLICATION

This application claims the benefit of U.S. Provisional Patent Application No. 63/216,425, which was filed on Jun. 29, 2021, the contents of which are incorporated herein by reference in their entirety.

BACKGROUND

In an optical communication system, optical amplifiers are used to amplify an input signal such as wavelength division multiplexed (WDM) light to enable long-distance transmission with low cost and high reliability. Exemplary optical amplifiers include Erbium Doped Fiber Amplifiers (EDFA) and Raman Amplifiers.

Raman Amplifiers transfer energy from one or more pump lasers to an incoming signal using a fiber medium via a phenomenon known as Simulated Raman Scattering (SRS). A desired gain profile for the incoming signal is achieved via careful configuration of the pump lasers power and/or wavelength. Conventionally, pump configuration to achieve a desired gain profile is done manually using a pump calibration table. The pump calibration table is produced by experimentation and gives an operator exemplary power and wavelength settings to obtain the desired gain profile. This process is iterative, time-consuming, and not always reliable as the pump calibration table itself may not be correct.

The methods and systems disclosed herein solve these problems by automatically configuring the pump laser attributes of a Raman Amplifier for a given gain profile with high accuracy and without the need for manual intervention by an operator.

SUMMARY

In one aspect, in accordance with some implementations, the specification describes methods and systems for automatically configuring pump laser attributes of a raman amplifier for a given gain profile with high accuracy and without the need for manual intervention by an operator by generating a machine learning model configured to output corrected raman pump configurations for the given gain profile, the machine learning model generated using machine learning techniques and deployed to a controller of the raman amplifier where it is stored in non-transitory computer readable memory. When a desired gain profile is input by a user and communicated to the controller, the controller automatically assesses the desired gain profile using the machine learning model to generate the raman pump configurations for each of the plurality of raman pumps of the raman amplifier.

More particularly, in one aspect of the present disclosure, a method of configuring a raman amplifier may comprise: generating a machine learning model using machine learning techniques comprising: training a neural network by inputting a plurality of training datasets into the neural network, each of the plurality of training datasets having at least one training gain profile associated with configurations of a plurality of raman pumps configured to achieve the at least one training gain profile, wherein the neural network successively analyzes the plurality of training datasets and adjusts weights of connections between nodes in layers of the neural network to correct outputs until a corrected training output is accurate to within a margin of error when compared to the configurations of the plurality of raman pumps associated with the at least one training gain profile, the neural network having the corrected training output being a trained neural network; and testing the trained neural network using at least one testing dataset, the at least one testing dataset comprising a testing gain profile as input data and configurations of a plurality of raman pumps configured to obtain the testing gain profile as known output data, the testing comprising inputting the input data of the at least one testing dataset into the trained neural network and comparing a corrected testing output of the trained neural network to the known output data of the at least one testing dataset. After the machine learning model has been generated, the machine learning model generates determined raman pump configurations and sends the determined raman pump configurations to each of a plurality of raman pumps of the raman amplifier.

In one aspect of the present disclosure, a system for configuring a raman amplifier may comprise: the raman amplifier having a plurality of raman pumps and a controller, the controller having a first processor and a first non-transitory computer readable memory storing first instructions; a user device having a second processor and a second non-transitory computer readable memory storing second instructions that, when executed, cause the user device to accept input from the user of a desired gain profile; and a network administration device having a third processor and a third non-transitory computer readable memory storing third instructions that when executed cause the third processor to generate a machine learning model using machine learning techniques and deploy the machine learning model to the controller of the raman amplifier where the machine learning model is stored in the first non-transitory computer readable memory of the controller; wherein the desired gain profile is communicated from the user device to the controller of the raman amplifier where the first instructions cause the controller to automatically assess the desired gain profile using the machine learning model to determine raman pump configurations for each of the plurality of raman pumps of the raman amplifier and send the determined raman pump configurations to each of the plurality of raman pumps of the raman amplifier.

The exemplary system for configuring a raman amplifier wherein generating the machine learning model using machine learning techniques may comprise: training a neural network by inputting a plurality of training datasets into the neural network, each of the plurality of training datasets having at least one training gain profile associated with configurations of a plurality of raman pumps configured to achieve the at least one training gain profile, wherein the neural network successively analyzes the plurality of training datasets and adjusts weights of connections between nodes in layers of the neural network to corrected outputs until a corrected training output is accurate to within a margin of error when compared to the configurations of the plurality of raman pumps associated with the at least one training gain profile.

The exemplary system for configuring a raman amplifier wherein the neural network having the corrected training output is a trained neural network and generating the machine learning model using machine learning techniques may further comprise: testing the trained neural network using at least one testing dataset, the at least one testing dataset comprising a testing gain profile as input data and configurations of a plurality of raman pumps configured to obtain the testing gain profile as known output data, the testing comprising inputting the input data of the at least one testing dataset into the trained neural network and comparing a corrected testing output of the trained neural network to the known output data of the at least one testing dataset.

The exemplary system for configuring a raman amplifier wherein the neural network is a feed-forward neural network, and wherein the layers of the feed-forward neural network comprises four layers of nodes including an input layer, a first hidden layer, a second hidden layer, and an output layer, wherein training the feed-forward neural network comprises assigning a weight to a connection between each of the nodes of the input layer, the first hidden layer, the second hidden layer, and the output layer.

Implementations of the above techniques include methods, apparatus, systems, and computer program products. One such computer program product is suitably embodied in a non-transitory machine-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features and advantages will become apparent from the description, the drawings, and the claims.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
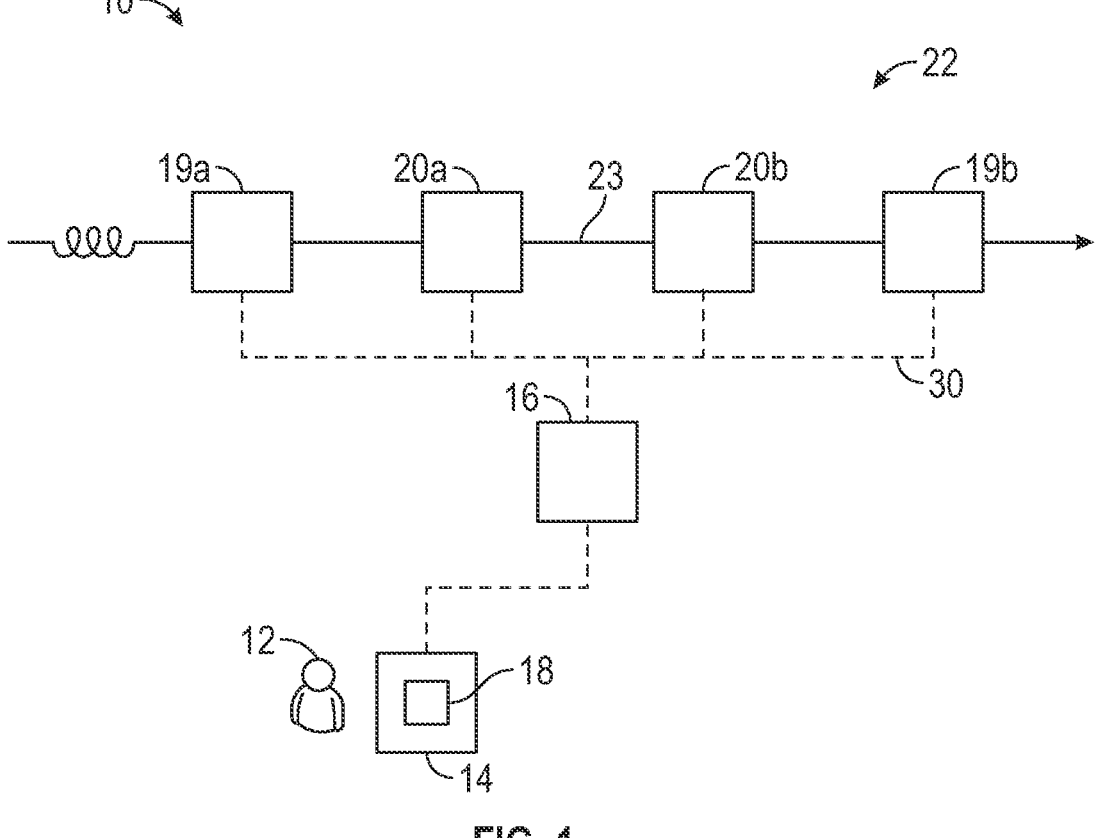
FIG. 1 is a diagrammatic view of hardware forming an exemplary optical network having a system for automatically configuring pump attributes of a raman amplifier for a desired gain profile constructed in accordance with one embodiment of the present disclosure.

The following detailed description of example embodiments refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), a combination of hardware and software, and/or the like. Software may include one or more computer executable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

As used herein, the terms "network-based," "cloud-based," and any variations thereof, are intended to include the provision of configurable computational resources on demand via interfacing with a computer and/or computer network, with software and/or data at least partially located on a computer and/or computer network.

As used herein, a "route" and/or an "optical route" may correspond to an optical path and/or an optical lightpath. For example, an optical route may specify a path along which light is carried between two or more network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

In some implementations, an optical link may be an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may be a super-channel group. A super-channel group may include multiple super-channels multiplexed together using wavelength-division multiplexing in order to increase transmission capacity.

Additionally, or alternatively, an optical link may be a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

As used herein, a transmission line segment is the portion of a transmission line from a first node (e.g., ROADM) transmitting a transmission signal to a second node (e.g., ROADM) receiving the transmission signal. The transmission line segment may include one or more optical in-line amplifier situated between the first node and the second node.

Raman scattering, also known as spontaneous Raman scattering, is an inelastic scattering of photons by matter, that is, the direction and energy of the light changes due to an exchange of energy between photons and the medium. Inelastic scattering is a fundamental scattering process in which the kinetic energy of an incident particle is not conserved. Stimulated Raman scattering (SRS) takes place when a signal light interacts in a medium with a pump light (light source or original light), which increases the Raman-scattering rate beyond spontaneous Raman scattering. Signal-Signal Stimulated Raman Scattering is Raman scattering caused by the injection of two or more signal lights into a light stream. Raman gain, also known as Raman amplification, is based on stimulated Raman scattering wherein a lower frequency photon induces the inelastic scattering of a higher-frequency photon in an optical medium.

As used herein, gain is a process wherein the medium on which a transmission signal is traveling transfers part of its energy to the emitted signal, in this case the transmission signal, thereby resulting in an increase in optical power. In other words, gain is a type of amplification of the transmission signal.

Amplified spontaneous emission (ASE) is light produced by spontaneous emission that has been optically amplified by the process of stimulated emission in a gain medium. ASE is an incoherent effect of pumping a laser gain medium to produce a transmission signal. If an amplified spontaneous emission power level is too high relative to the transmission signal power level, the transmission signal in the fiber optic cable will be unreadable due to a low signal to noise ratio.

Transmission launch power may include a spectral power, which may be described in decibels (dB), of a transmission signal after each transmitter or amplifier.

As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a reconfigurable add-drop multiplexer (ROADM) node refers to an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching (WSS)—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

As used herein, a labeled dataset refers to a set of data that has been tagged with one or more labels identifying certain properties or characteristics associated with each data point in the labeled dataset. Each data point in the labeled dataset will be referred to as labeled data which is used in data training and testing exercises involving a neural network as will be described in detail herein.

FIG. 1 is a diagrammatic view of hardware forming an exemplary system 10 for automatic configuration of pump attributes of a raman amplifier to achieve a desired gain profile constructed in accordance with one embodiment of the present disclosure. A user 12 may interact with the system 10 using a user device 14 that may be used to request, from a network administration device 16, a graphical user interface 18 (hereinafter "GUI 18") configured to accept input from the user 12 such as a desired gain profile that may be transmitted to one or more optical amplifier 20 such as a first optical amplifier 20a, and/or a second optical amplifier 20b of an optical network 22.

The network administration device 16 may be connected to the optical network 22 and the user device 14 via a network 30. In some embodiments, the network 30 may be the Internet and/or other network. For example, if the network 30 is the Internet, the GUI 18 of the system 10 may be delivered through a series of web pages or private internal web pages of a company or corporation, which may be written in hypertext markup language. It should be noted that the GUI 18 of the system 10 may be another type of interface including, but not limited to, a Windows-based application, a tablet-based application, a mobile web interface, an application running on a mobile device, and/or the like.

The network 30 may be almost any type of network. For example, in some embodiments, the network 30 may be a version of an Internet network (e.g., exist in a TCP/IP-based network). It is conceivable that in the near future, embodiments within the present disclosure may use more advanced networking technologies.

Optical network 22 may include any type of network that uses light as a transmission medium. For example, optical network 22 may include a wavelength division multiplexed optical communication system, a fiber-optic based network, an optical transport network, a light-emitting diode network, a laser diode network, an infrared network, and/or a combination of these or other types of optical networks. The optical network may be provided with one or more optical node 19 such as optical node 19a and optical node 19b. The one or more optical nodes 19 may be a reconfigurable add-drop multiplexer (ROADM) node. A fiber span 23 connects Optical nodes 19 and optical amplifiers 20 in the optical network 22.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of system 10 may perform one or more functions described as being performed by another one or more of the devices of the system 10. Devices of the system 10 may interconnect via wired connections, wireless connections, or a combination of wired and wireless connections.

Figure 2:
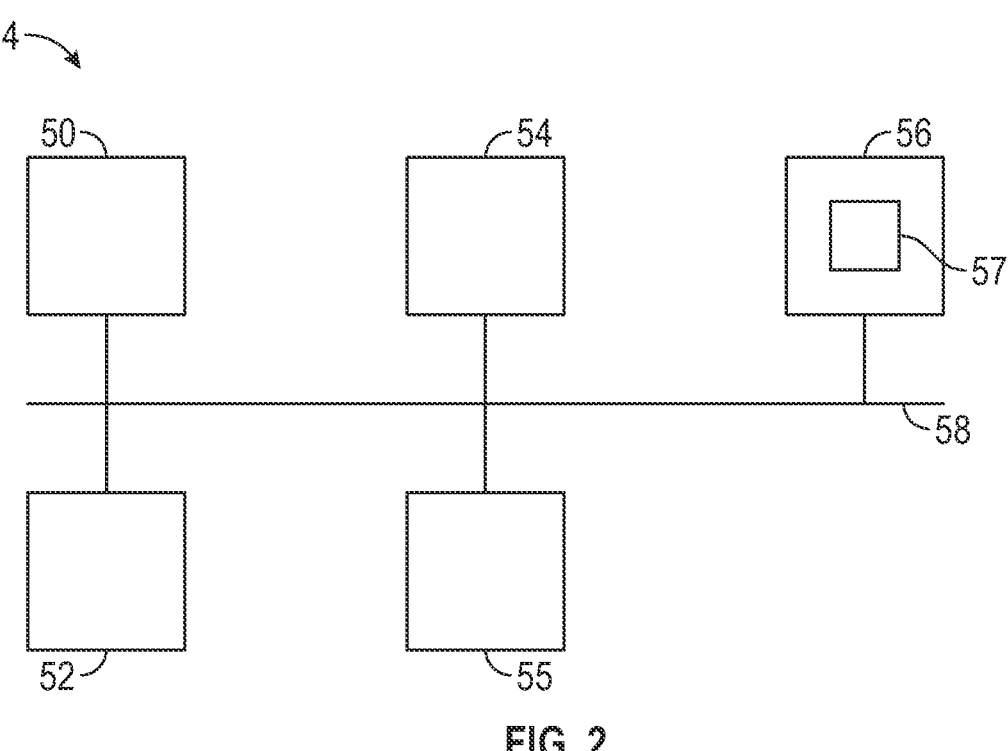
FIG. 2 is a diagrammatic view of an exemplary user device for use in the system for automatically configuring pump attributes of the raman amplifier for a desired gain profile illustrated in FIG. 1.

As shown in FIG. 2, the one or more user devices 14 of the system 10 may include, but are not limited to implementation as a personal computer, a cellular telephone, a smart phone, a network-capable television set, a tablet, a laptop computer, a desktop computer, a network-capable handheld device, a server, a digital video recorder, a wearable network-capable device, and/or the like.

In some embodiments, the user device 14 may include one or more input devices 50 (hereinafter "input device 50"), one or more output devices 52 (hereinafter "output device 52"), one or more processors 54 (hereinafter "processor 54"), one or more communication devices 55 (hereinafter "communication device 55") capable of interfacing with the network 30, one or more non-transitory memory 56 (hereinafter "memory 56") storing processor executable code and/or software application(s), for example including, a web browser capable of accessing a website and/or communicating information and/or data over a wireless or wired network (e.g., network 30), and/or the like. The input device 50, output device 52, processor 54, communication device 55, and memory 56 may be connected via a path 58 such as a data bus that permits communication among the components of user device 14.

The memory 56 may store an application 57 that, when executed by the processor 54 causes the user device 14 to display the GUI 18. In some embodiments, the application 57 is programmed to cause the processor 54 to provide the GUI 18 that allows the user 12 to interact with both historical and real-time information gathered from the network elements 20 as will be described further herein. The input device 50 may be capable of receiving information input from the user 12 and/or processor 54, and transmitting such information to other components of the user device 14 and/or the network 30. The input device 50 may include, but are not limited to, implementation as a keyboard, touchscreen, mouse, trackball, microphone, fingerprint reader, infrared port, slide-out keyboard, flip-out keyboard, cell phone, PDA, remote control, fax machine, wearable communication device, network interface, combinations thereof, and/or the like, for example.

The output device 52 may be capable of outputting information in a form perceivable by the user 12 and/or processor 54. For example, implementations of the output device 52 may include, but are not limited to, a computer monitor, a screen, a touchscreen, a speaker, a web site, a television set, a smart phone, a PDA, a cell phone, a fax machine, a printer, a laptop computer, combinations thereof, and the like, for example. It is to be understood that in some exemplary embodiments, the input device 50 and the output device 52 may be implemented as a single device, such as, for example, a touchscreen of a computer, a tablet, or a smartphone. It is to be further understood that as used herein the term user 12 is not limited to a human being, and may comprise, a computer, a server, a website, a processor, a network interface, a human, a user terminal, a virtual computer, combinations thereof, and/or the like, for example.

The network administration device 16 may be capable of interfacing and/or communicating with the user device 14 via the network 30. For example, the network administration device 16 may be configured to interface by exchanging signals (e.g., analog, digital, optical, and/or the like) via one or more ports (e.g., physical ports or virtual ports) using a network protocol, for example. Additionally, each network administration device 16 may be configured to interface and/or communicate with other network administration device 16 directly and/or via the network 30, such as by exchanging signals (e.g., analog, digital, optical, and/or the like) via one or more ports.

The network 30 may permit bi-directional communication of information and/or data between the network administration device 16, the user device 14, and/or the optical amplifiers 20. The network 30 may interface with the network administration device 16, the user device 14, and/or the optical amplifiers 20 in a variety of ways. For example, in some embodiments, the network 30 may interface by optical and/or electronic interfaces, and/or may use a plurality of network topographies and/or protocols including, but not limited to, Ethernet, TCP/IP, circuit switched path, combinations thereof, and/or the like. For example, in some embodiments, the network 30 may be implemented as the World Wide Web (or Internet), a local area network (LAN), a wide area network (WAN), a metropolitan network, a 4G network, a 5G network, a satellite network, a radio network, an optical network, a cable network, a public switch telephone network, an Ethernet network, combinations thereof, and the like, for example. Additionally, the network 30 may use a variety of network protocols to permit bi-directional interface and/or communication of data and/or information between the network administration device 16, the user device 14 and/or the optical amplifiers 20.

Figure 3:
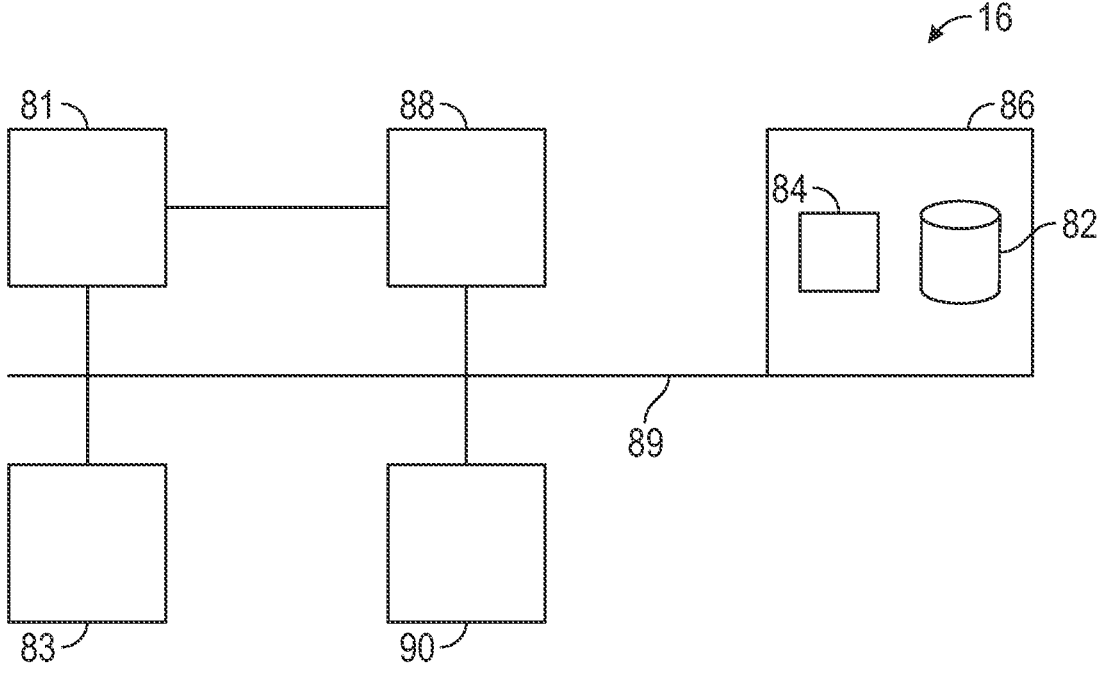
FIG. 3 is a diagrammatic view of an exemplary embodiment of a network administration device for use in the system for automatically configuring pump attributes of the raman amplifier for a desired gain profile illustrated in FIG. 1.

Referring now to FIG. 3, shown therein is a diagrammatic view of an exemplary embodiment of the network administration device 16. The network administration device 16 may include one or more devices that gather, process, search, store, and/or provide information in a manner described herein. In the illustrated embodiment, the network administration device 16 is provided with an input device 81 one or more databases 82 (hereinafter "database 82"), program logic 84, and one or more processors 88 (hereinafter "processor 88"). The program logic 84 and the database 82 are stored on non-transitory computer readable storage memory 86 (hereinafter "memory 86") accessible by the processor 88 of the network administration device 16. It should be noted that as used herein, program logic 84 is another term for instructions which can be executed by the processor 24 or the processor 88. The database 82 can be a relational database or a non-relational database. Examples of such databases comprise, DB2®, Microsoft® Access, Microsoft® SQL Server, Oracle®, mySQL, PostgreSQL, MongoDB, Apache Cassandra, and the like. It should be understood that these examples have been provided for the purposes of illustration only and should not be construed as limiting the presently disclosed inventive concepts. The database 82 can be centralized or distributed across multiple systems.

In some embodiments, the network administration device 16 may comprise one or more processors 88 working together, or independently to, execute processor executable code stored on the memory 86. Additionally, each network administration device 16 may include at least one input device 81 (hereinafter "input device 81") and at least one output device 83 (hereinafter "output device 83"). Each element of the network administration device 16 may be partially or completely network-based or cloud-based, and may or may not be located in a single physical location.

The processor 88 may be implemented as a single processor or multiple processors working together, or independently, to execute the program logic 84 as described herein. It is to be understood, that in certain embodiments using more than one processor 88, the processors 88 may be located remotely from one another, located in the same location, or comprising a unitary multi-core processor. The processors 88 may be capable of reading and/or executing processor executable code and/or capable of creating, manipulating, retrieving, altering, and/or storing data structures into the memory 86.

Exemplary embodiments of the processor 88 may be include, but are not limited to, a digital signal processor (DSP), a central processing unit (CPU), a field programmable gate array (FPGA), a graphics processing unit (GPU), a microprocessor, a multi-core processor, combinations, thereof, and/or the like, for example. The processor 88 may be capable of communicating with the memory 86 via a path 89 (e.g., data bus). The processor 88 may be capable of communicating with the input device 81 and/or the output device 83.

The processor 88 may be further capable of interfacing and/or communicating with the user device 14 and/or the optical node 19 or the optical amplifier 20 via the network 30 using the communication device 90. For example, the processor 88 may be capable of communicating via the network 30 by exchanging signals (e.g., analog, digital, optical, and/or the like) via one or more ports (e.g., physical or virtual ports) using a network protocol to provide a pump model to the optical amplifier 20 as will be described in further detail herein.

The memory 86 may be capable of storing processor executable code such as program logic 84. Additionally, the memory 86 may be implemented as a conventional non-transitory memory, such as for example, random access memory (RAM), CD-ROM, a hard drive, a solid-state drive, a flash drive, a memory card, a DVD-ROM, a disk, an optical drive, combinations thereof, and/or the like, for example.

In some embodiments, the memory 86 may be located in the same physical location as the network administration device 16, and/or one or more memory 86 may be located remotely from the network administration device 16. For example, the memory 86 may be located remotely from the network administration device 16 and communicate with the processor 88 via the network 30. Additionally, when more than one memory 86 is used, a first memory 86 may be located in the same physical location as the processor 88, and additional memory 86 may be located in a location physically remote from the processor 88. Additionally, the memory 86 may be implemented as a "cloud" non-transitory computer readable storage memory (i.e., one or more memory 86 may be partially or completely based on or accessed using the network 30).

The input device 81 of the network administration device 16 may transmit data to the processor 88 and may be similar to the input device 50 of the user device 14. The input device 81 may be located in the same physical location as the processor 88, or located remotely and/or partially or completely network-based. The output device 83 of the network administration device 16 may transmit information from the processor 88 to the user 12, and may be similar to the output device 52 of the user device 14. The output device 83 may be located with the processor 88, or located remotely and/or partially or completely network-based.

The memory 86 may store processor executable code and/or information comprising the database 82 and program logic 84. In some embodiments, the processor executable code 84 may be stored as a data structure, such as the database 82 and/or data table, for example, or in non-data structure format such as in a non-compiled text file.

Optical node 19 may include one or more devices that gather, process, store, and/or provide information in a manner described herein. For example, optical node 19 may include one or more optical data processing and/or traffic transfer devices, such as an optical add-drop multiplexer ("OADM"), a reconfigurable optical add-drop multiplexer ("ROADM"), a flexibly reconfigurable optical add-drop multiplexer module ("FRM"), an optical source component (e.g., a laser source), an optical source destination (e.g., a laser sink), an optical multiplexer, an optical demultiplexer, an optical transmitter, an optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic.

In some implementations, optical node 19 may include OADMs and/or ROADMs capable of being configured to add, drop, multiplex, and demultiplex optical signals. Optical node 19 may process and transmit optical signals to other optical nodes 19 throughout optical network 22 in order to deliver optical transmissions.

Figure 4:
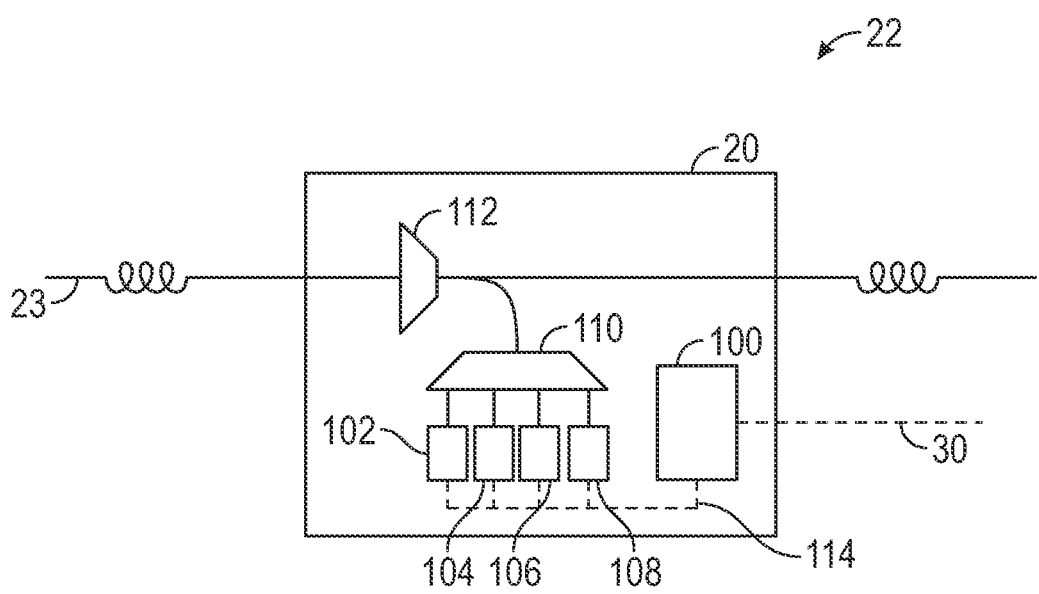
FIG. 4 is a diagrammatic view of an exemplary embodiment of an optical amplifier for use in the system for automatically configuring pump attributes of the raman amplifier for a desired gain profile constructed in accordance with one embodiment of the present disclosure.
Figure 5:
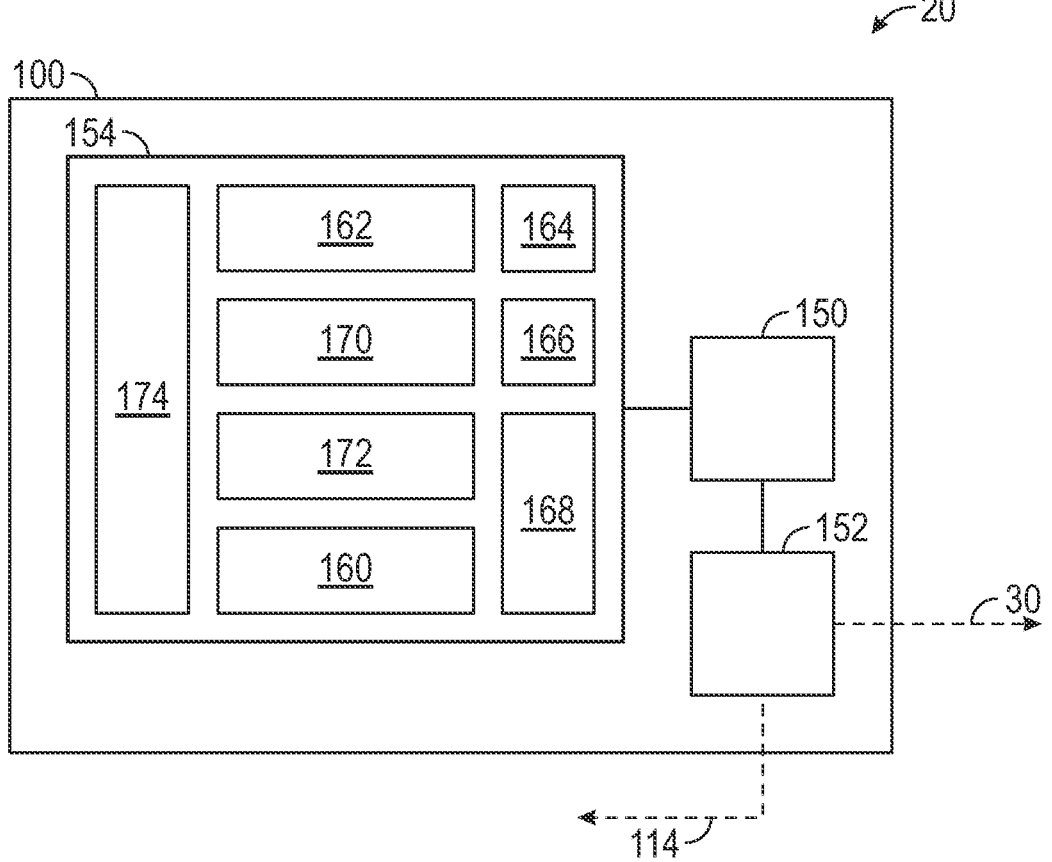
FIG. 5 is a diagrammatic view of an exemplary controller of the optical amplifier of FIG. 4 constructed in accordance with one embodiment of the present disclosure.

Referring now to FIGS. 4 and 5, shown therein is a diagrammatic view of an exemplary optical amplifier 20 of optical network 22 that may be monitored and/or configured according to implementations described herein. In accordance with the present disclosure, the optical amplifier 20 may be a Raman amplifier that makes use of stimulated Raman scattering (SRS) within the fiber of the optical network 22, which transfers the energy of higher-frequency raman pump signals to lower-frequency carrier signals. The amplification occurs along the fiber of the optical network 22. The typical configuration is a backward pump scheme, as indicated in FIG. 4, which introduces less noise. In practice, a Raman amplifier uses multiple pump lasers to realize high gain and flatness. Using a polarization multiplexer, such as pump combiner 110, two or more raman pumps 102, 104, 106, and 108 with a same center frequency can be used to pump power and reduce a polarization dependency of Raman gain. When using a different wavelength, pump power of the raman pumps 102, 104, 106, and 108 can be increased, and bandwidth may be enlarged as well. By adjusting the ratio of these raman pump powers, optical amplifier 20 can achieve flat gain. To obtain optimum performance, a power of each raman pump 102, 104, 106, and 108 has to be set according to a signal spectrum of a carrier signal received by the optical amplifier 20.

The optical amplifier 20 is illustrated with a controller 100 for controlling Raman pumps 102, 104, 106, and 108 of the optical amplifier 20. The optical amplifier 20 may further be provided with pump combiner 110, a WDM 112, and an interface 114 that connects the controller 100 to the Raman pumps 102, 104, 106, and 108.

As shown in FIG. 5, the controller 100 may be a microcontroller, for instance, that is provided with a processor 150, a communication device 152, and non-transitory computer readable memory 154 ("memory 154"). The memory 154 may store a machine learning model 160 that may be used to compute raman pump configurations that may include a power and/or wavelength values required to achieve a desired gain profile. The controller 100 receives a desired gain profile through the network 30 from the user device 14 or the network administration device 16. The desired gain profile is used by the controller 100 to obtain power and/or wavelength values from the machine learning model 160 for each of the raman pumps 102, 104, 106, and 108 as will be described further herein. The controller 100 outputs, through the interface 114, power and/or wavelength control values for the respective Raman pumps 102, 104, 106, and 108.

The memory 154 may further store an application programming interface 162, a UI visualization module 164, data transformers 166, a logging and tracing module 168, a task management module 170, a business logic module 172, and a security module 174.

Data transformers 166 transform data from one scale to another for example 0 to 1, −1 to 1, etc. This may be done to make an artificial intelligence (AI) machine learning algorithm (such as feed-forward neural network 200 that will be described in detail herein) more effective so that all inputs are scaled to a common base, for instance. The data transformers 166 may be implemented in code or using a library such as MinMaxScaler, for instance.

Task management module 170 ensures the queries for a machine learning model (such as machine learning model 160) are handled as separate thread context, so that multiple requests can be handled in parallel. The task management module 170 may be implemented using POSIX threads or language specific multithreading support, for instance.

Business logic module 172 implements software validations of machine learning models which may include a manual override and minimum and maximum allowable values for the model output, for instance. If the manual override is implemented by the business logic module 172, a value computed by the machine learning model will be ignored. If the minimum and/or maximum allowable values are implemented by the business logic module 172, the business logic module 172 may be programmed to ensure that outputs from the machine learning model are under a maximum value and/or over a minimum value which may be based on range specified by the user.

The number of devices illustrated in FIGS. 4 and 5 are provided for explanatory purposes. In practice, there may be additional devices, fewer devices, different devices, or differently arranged devices than are shown in FIGS. 4 and 5. Furthermore, two or more of the devices illustrated in FIGS. 4 and 5 may be implemented within a single device, or a single device illustrated in FIG. 4 may be implemented as multiple, distributed devices. Additionally, one or more of the devices illustrated in FIG. 4 may perform one or more functions described as being performed by another one or more of the devices illustrated in FIG. 4. Devices illustrated in FIG. 4 may interconnect via wired connections (e.g., fiber-optic connections).

Machine Learning (ML) is generally the scientific study of algorithms and statistical models that computer systems use in order to perform a specific task effectively without using explicit instructions, but instead relying on patterns and inference. ML is considered a subset of artificial intelligence (AI). Machine learning algorithms build a mathematical model based on sample data, known as "training data", in order to make predictions or decisions without being explicitly programmed to perform the task. Machine Learning algorithms are commonly in the form of an artificial neural network (ANN), also called a neural network (NN). A neural network "learns" to perform tasks by considering examples, generally without being programmed with any task-specific rules. The examples used to teach a neural network may be in the form of truth pairings comprising a test input object and a truth value that represents the true result from the test input object analysis. When a neural network has multiple layers between the input and the output layers, it may be referred to as a deep neural network (DNN).

Feed-forward Neural Networks are artificial neural networks where node connections do not form a cycle. In other words, information flows only in a forward direction from input nodes, through any layers of hidden nodes, and to output nodes. There is no feedback connection so that the network output is fed back into the network without flowing out. Feed-forward Neural Networks are biologically inspired algorithms that have several neuron-like units arranged in layers. The units in Feedforward Neural Networks are connected and are called nodes. Feedforward Neural Networks process training data by mimicking the interconnectivity of the human brain through the layers of nodes. Each node is made up of inputs, weights, a bias (or threshold), and an output. If the output value of the node exceeds a given threshold, it "fires" or activates the node, passing data to the next layer in the neural network. Connections between nodes differ in strength and/or weight. The weight of the connections provides vital information about the neural network. Neural networks learn a mapping function through supervised learning, adjusting based on a loss function through a process of gradient descent. When the loss function is at or near zero, it is likely that the neural network's model will yield a correct answer.

Figure 6:
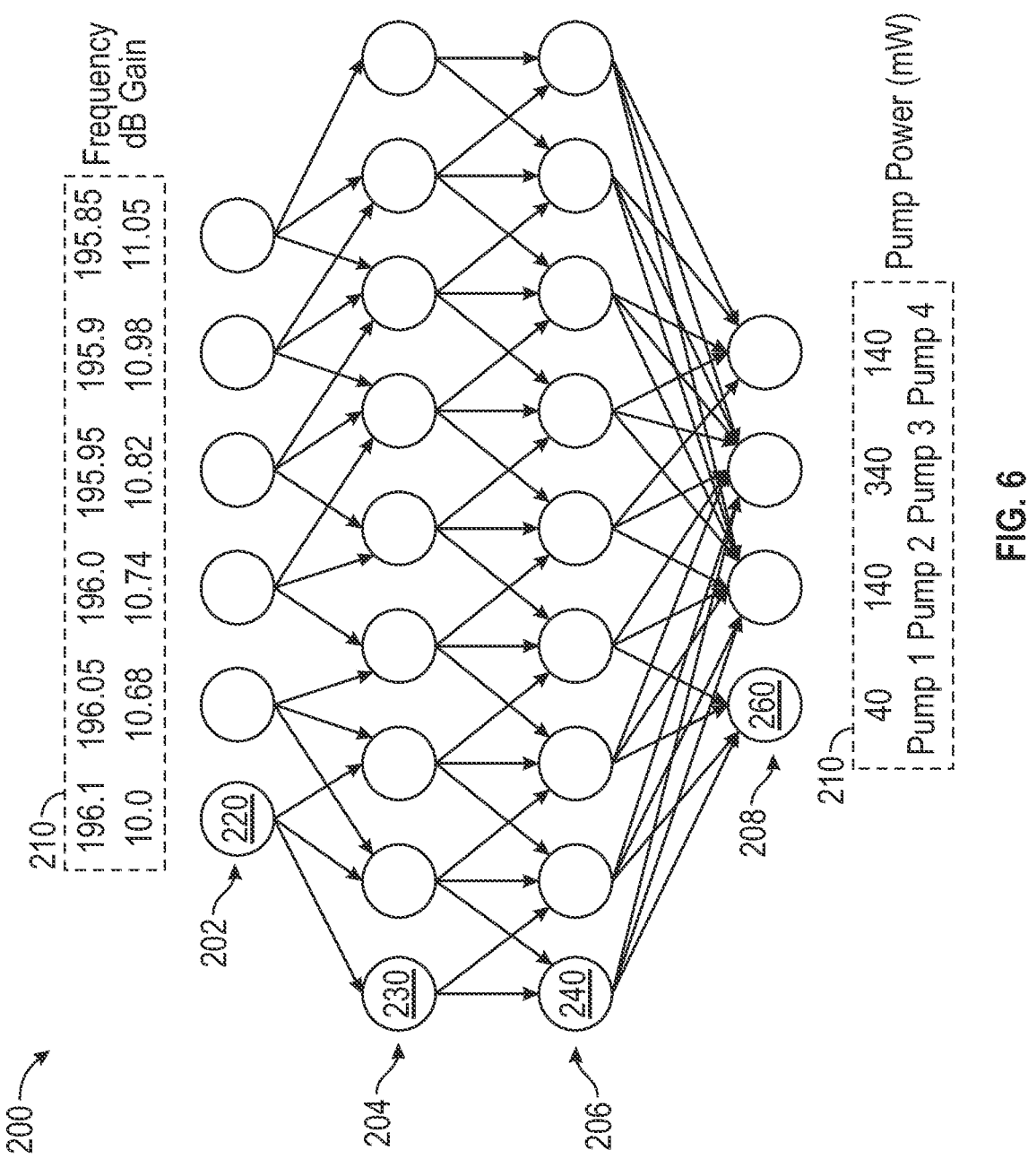
FIG. 6 is a diagram of a feed-forward neural network model constructed in accordance with one embodiment of the present disclosure.

Referring now to FIG. 6, shown therein is a diagrammatic representation of an exemplary feed-forward neural network 200 that may be part of the program logic 84 of the network administration device 16. The feed-forward neural network 200 may comprise an input layer 202, a first hidden layer 204, a second hidden layer 206, and an output layer 208.

The input layer 202 may be provided with input nodes 220 that receive input and transfer the input to different layers in the feed-forward neural network 200 such as the first hidden layer 204. A number of input nodes 220 in the input layer 202 is the same as a number of features or attributes in a dataset. For instance, in the illustrated feed-forward neural network 200, the input layer 202 has six input nodes 220 (only one of which is numbered in FIG. 6) each corresponding to a gain in decibels at a given frequency that makeup a gain profile in a training dataset 210. Other exemplary features that may be used as input data include frequency separation, number of pumps, scaling, fiber optic line material properties (e.g., gain per distance), fiber optic line distance between amplifiers, and/or spectral status of a transmission signal.

The first and second hidden layers 204 and 206 are positioned between the input layer 202 and the output layer 208. The number of hidden layers depends on a type of desired model. The hidden layers 204 and 206 each have nodes 230 and 240, respectively, that impose transformations on the input (gain in dB) before transferring the transformed data to a next layer if the transformed data meets certain criteria as will be explained further herein.

It should be noted that the first hidden layer 204 and the second hidden layer 206 may be provided with any number of nodes operating in parallel with each node 230 in the first hidden layer 204 receiving input from at least one input node 220 and each node 240 in the second hidden layer 206 receiving input from at least one node 230 in the first hidden layer. Increasing the number of nodes 230 and 240 in the first and second hidden layers 204 and 206 may increase model accuracy, however, the increase in nodes will also increase the resource consumption (e.g., a time period for the network administration device 16 to train the feed-forward neural network 200 will increase). Therefore, the number of nodes 230 and 240 in the hidden layers 204 and 206 of the feed-forward neural network 200 may be designed taking into account factors such as resource constraints and inference and training time.

A strength or magnitude of connection between two nodes is called a weight. For the sake of illustration, weights are represented by arrows such as the arrow connecting input node 220 and node 230, for instance. The value of the weights is usually small and may fall within a range of 0 to 1. The weights are related to each input of each node. For instance, node 230 is illustrated with only one input. Node 240 of the second hidden layer 204, on the other hand, has two inputs. The feed-forward neural network 200 studies these weights during a learning phase and can adjust the weights as will be described further herein.

When a node receives data, the node determines a sum of the input data and the weight of the connection. After determining the sum of the input data and the weight, the node initiates an activation function to normalize the sum. The activation function can be either linear or nonlinear. Exemplary activation functions are sigmoid, Tan h, and Rectified Linear Unit (ReLu). The sigmoid function maps the input values within the range of 0 to 1. The Tan h function maps the input values between −1 and 1. The rectified linear Unit function allows only positive values to flow through. The negative values are mapped at 0.

In some embodiments, a bias may be applied at each node 230 and 240 in the hidden layers 204 and 206. The bias is an external parameter of the node 230 and 240 and may be modeled by adding an external fixed value, for instance.

Using a property known as the delta rule, the feed-forward neural network 200 compares outputs of the output nodes 260 with the intended values from the training dataset 210 (such as the illustrated pump power for each raman pump), thus allowing the feed-forward neural network 200 to adjust the weights through training in order to produce more accurate output values. This process of training and learning produces a form of a gradient descent. In multi-layered neural networks such as feed-forward neural network 200, the process of updating weights is defined more specifically as back-propagation. Each hidden layer 204 and 206 within the feed-forward neural network 200 is adjusted according to the output values produced by the output layer 208.

In some embodiments, the feed-forward neural network 200 may use a cost function to determine the changes to make to the weights and/or biases.

As data travels through the feed-forward neural network 200, each hidden layer 204 and 206 acts as a filter that may remove outliers and other known components before passing the data to the next layer following which the feed-forward neural network 200 generates a final output at the output layer 208 which is used to update the weights of each hidden layer 204 and 206 through back-propagation to tune the feed-forward neural network 200.

The feed-forward neural network 200 uses training datasets such as training dataset 210 that may be a labeled dataset. The training dataset 210 includes labeled data such as the gain in dB for a given frequency used as inputs and correct outputs such as the pump power for each raman pump, which allows the feed-forward neural network 200 to learn over time. The feed-forward neural network 200 may measure accuracy using a loss function and/or a mean squared error calculation, adjusting until errors have been sufficiently minimized. Or, in other words, until the output of the feed-forward neural network 200 are within a desired margin of error. This phase of operation of the feed-forward neural network 200 is called a training phase.

In one embodiment, a wavelength of the raman pumps 102, 104, 106, and 108 may be measured in nanometers (nm) and the desired margin of error of the wavelength may be less than two nanometers (<2 nm).

In one embodiment, a power of the raman pumps 102, 104, 106, and 108 may be measured in milliwatts (mW) and the desired margin of error of the power may be less than twenty milliwatts (<20 mW).

A length of the training phase may depend on a size of the feed-forward neural network 200, a number of training datasets under observation, resource constraints, inference and training time, model format (e.g., number of hidden layers, size of each hidden layer, etc.), platform and language support, and resource consumption, for instance.

Once the feed-forward neural network 200 has been through the training phase, a trained feed-forward neural network 200 may be tested using testing datasets. Testing datasets are similar to training dataset 210, however, they are datasets that the feed-forward neural network 200 was not been exposed to. In other words, the testing datasets have new input data and correlated truth data or output data that can be used to verify if the trained feed-forward neural network 200 produces outputs that are within the desired margin of error.

Figure 7:
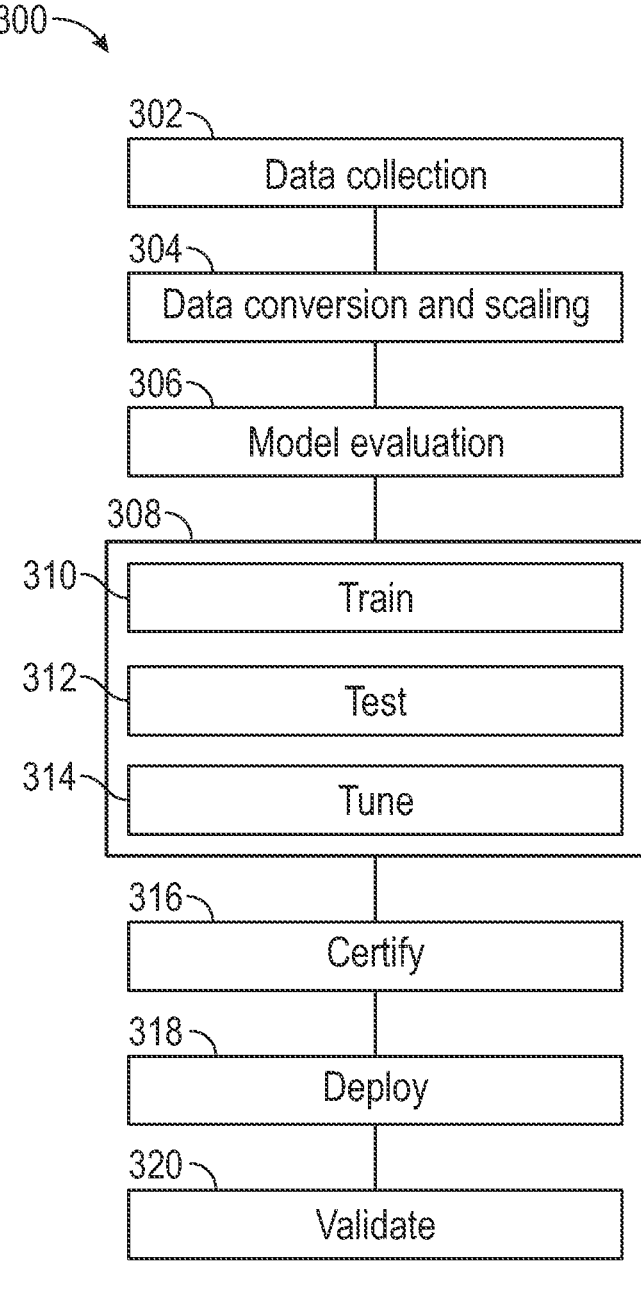
FIG. 7 is a diagram of an example work flow for creating a machine learning model for use in the system for automatically configuring pump attributes of the raman amplifier for a desired gain profile in accordance with one embodiment of the present disclosure.

Referring now to FIG. 7, shown therein is an exemplary workflow diagram 300 for creating a machine learning model, such as machine learning model 160, for instance, using the feed-forward neural network 200. In step 302, data may be collected to be used to train and test the machine learning model 160 using the feed-forward neural network 200. For instance, data may be collected from pump calibration tables, simulations using a raman simulator, an ordinary differential equation (ODE) such as Matlab, and testing of raman cards.

In step 304, collected data may be converted to a format useable by the feed-forward neural network 200. The collected data may further be scaled and/or filtered to remove unwanted data.

In step 306, model types may be evaluated based on factors such as loss, training time, inference time, resource consumption, bias/variance trade-off, and platform and language support, for instance.

In step 308, the machine learning model 160 may be created using the feed-forward neural network 200 by training the machine learning model 160 in step 310 and testing the machine learning model 160 in step 312 as described above. When a new feature is introduced or a feature is changed, the machine learning model 160 may be tuned in step 314 to optimize the machine learning model 160 for the new and/or changed feature. Exemplary features include pump manufacturer, number of pumps, frequency separation, scaling, fiber optic line material properties (e.g., gain per distance), fiber optic line distance between amplifiers, and/or current spectral status of the transmission signal, for instance. It should be noted, however, that in some instances a new machine learning model may be created rather than tuning the machine learning model 160.

Once the machine learning model 160 is created, an accuracy of the machine learning model 160 may be certified in step 316. Certification of the machine learning model 160 may include inputting known input data that has not been used in the training (step 310) or testing (step 312) of the machine learning model 160 and comparing an output (which may be referred to as a corrected output) of the machine learning model 160 with known output associated with the known inputs. The machine learning model 160 is certified if the output of the machine learning model 160 when compared to the known output is within an error acceptance criterion a predetermined percentage of the time. For instance, in one embodiment, the output may be a wavelength of the raman pumps 102, 104, 106, and 108 measured in nanometers (nm) and the error acceptance criterion of the wavelength may be less than two nanometers (<2 nm). In another embodiment, the output may be the power of the raman pumps 102, 104, 106, and 108 measured in milliwatts (mW) and the error acceptance criterion of the power may be less than twenty milliwatts (<20 mW). In one embodiment, for the machine learning model 160 to be certified, the output of the machine learning model 160 must meet the error acceptance criterion in over ninety-five percent (95%) of the cases. For instance, during certification, one-hundred (100) known input cases may be fed into the machine learning model 160 and the output in each case may be compared to the known outputs for each case. If the output of the machine learning model 160 meets the error criterion in ninety-five (95) or more of the cases when compared to the known outputs, the machine learning model 160 is certified.

In step 318, the machine learning model 160 is deployed to the controller 100 of the optical amplifier 20. For instance, the machine learning model 160 may be transferred from the network administration device 16 via the network 30 to the optical amplifier 20.

In step 320, the machine learning model 160 deployed on the optical amplifier 20 may be validated by testing an output signal at the fiber span 23 after a test gain profile is applied, for instance. In another embodiment, the machine learning model 160 may be validated by comparing output of the machine learning model 160 to previously calculated outputs such as a pump calibration table.

Figure 8:
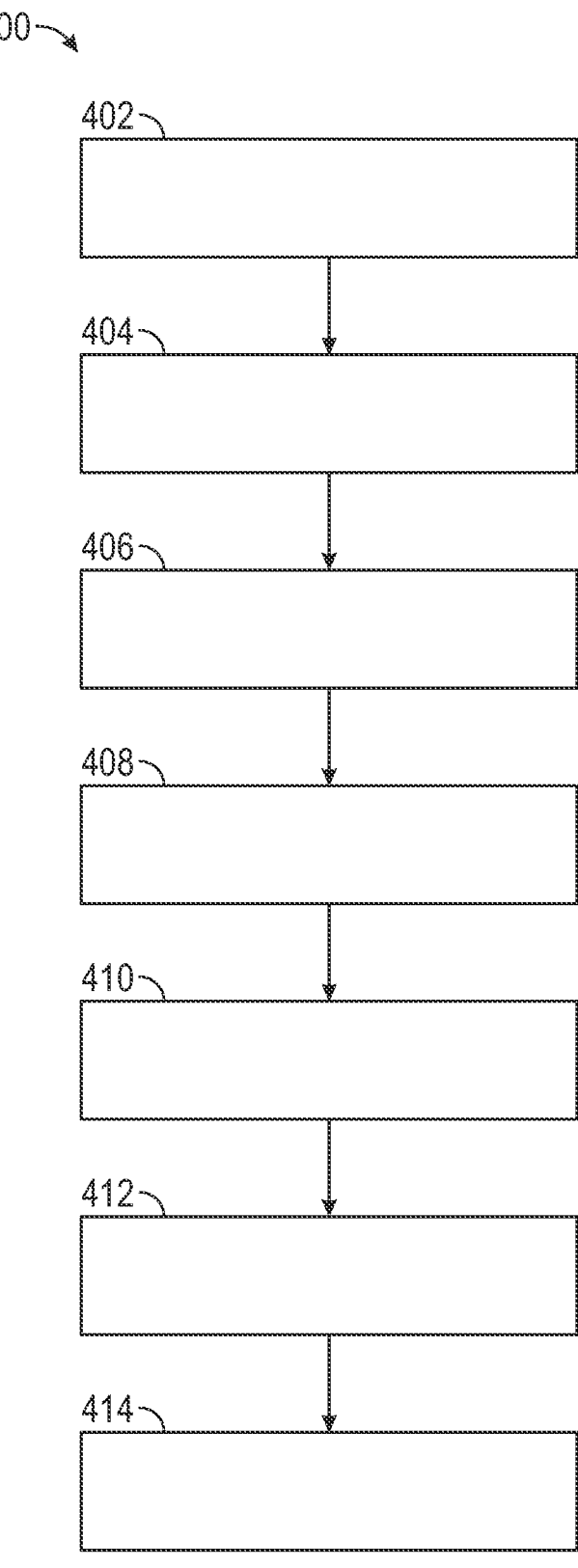
FIG. 8 is a diagram of a process for automatically configuring pump attributes of a raman amplifier based on a desired gain profile in accordance with one embodiment of the present disclosure.

Referring now to FIG. 8, shown therein is an exemplary process diagram illustrating a process 400 of automatically configuring a raman amplifier based on a desired gain profile. For the sake of illustration, the process 400 will be described using the elements of the system 10 described above. In step 402, the user 12 inputs a desired gain profile into the GUI 18 on the user device 14.

In step 404, the user device sends the desired gain profile to the controller 100 of the optical amplifier 20 via the network 30.

In step 406, the controller 100 computes pump attributes for the raman pumps 102, 104, 106, and 108 by inputting the desired gain profile into the machine learning model 160 to obtain a pump configuration for each of the raman pumps 102, 104, 106, and 108, the pump configuration including pump attributes such as pump power and/or wavelength.

In optional step 408, the controller 100 of the optical amplifier 20 sends a request for confirmation to the user device 14, the request for confirmation including the pump configuration for each of the raman pumps 102, 104, 106, and 108 and an indicator such as a selectable button configured to accept input from the user 12 indicating confirmation to commit the pump configurations.

In step 410, the pump configurations are applied to the raman pumps 102, 104, 106, and 108 by sending a signal containing the pump configurations to each of the raman pumps 102, 104, 106, and 108 via the interface 114. The raman pumps 102, 104, 106, and 108 are configured to implement the pump configurations once the signal containing the pump configurations is received.

In step 412, the raman pumps 102, 104, 106, and 108 are run using the pump configurations. For instance, the raman pumps 102, 104, 106, and 108 may execute the pump configurations in closed loop controls to amplify optical signals passing through the fiber span 23.

In optional step 414, the controller 100 may send confirmation and/or a status update to the user device 14 via the network 30 that may be displayed to the user 12 via the GUI 18.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A method of configuring a raman amplifier, comprising:
receiving user input comprising a designed gain profile;
generating a machine learning model using machine learning techniques;
deploying the machine learning model to a controller of the raman amplifier, the machine learning model stored in a non-transitory computer readable memory of the controller;
wherein generating the machine learning model using machine learning techniques comprises:
training a neural network by inputting a plurality of training datasets into the neural network, each of the plurality of training datasets having at least one training gain profile associated with configurations of a plurality of raman pumps configured to achieve the at least one training gain profile, wherein the neural network successively analyzes the plurality of training datasets and adjusts the weights of connections between nodes in layers of the neural network to correct outputs until a corrected training output is accurate to within a margin of error when compared to the configurations of the plurality of raman pumps associated with the at least one training gain profile, the neural network having the corrected training output being a trained neural network;
deploying the machine learning model to a controller of the raman amplifier, the machine learning model stored in a non-transitory computer readable memory of the controller wherein the step of generating determined raman pump configurations by the machine learning model is performed by the controller and the controller sends the determined raman pump configurations to each of the plurality of raman pumps of the raman amplifier,
communicating the desired gain profile to the controller of the raman amplifier;
assessing, automatically by the controller of the raman amplifier, the desired gain profile using the machine learning model to determine raman pump configurations for each of the plurality of raman pumps of the raman amplifier;
and
sending the determined raman pump configurations to each of the plurality of raman pumps of the raman amplifier;
wherein the neural network is a feed-forward neural network and wherein the layers of the feed-forward neural network comprises four layers of nodes including an input layer, a first hidden layer, a second hidden layer, and an output layer, wherein training the feedforward neural network comprises assigning a weight to a connection between each of the nodes of the input layer, the first hidden layer, the second hidden layer, and the output layer.

2. The method of claim 1, wherein generating the machine learning model using machine learning techniques further comprises testing the trained neural network using at least one testing dataset, the at least one testing dataset comprising a testing gain profile as input data and configurations of a plurality of raman pumps configured to obtain the testing gain profile as known output data, the testing comprising inputting the input data of the at least one testing dataset into the trained neural network and comparing a corrected testing output pf the trained neural network to the known output data of the at least one testing dataset.

3. The method of claim 1, wherein the raman pump configurations for each of the plurality of raman pumps is a wavelength of the raman pumps measured in nanometers and the margin of error for the wavelength of the raman pumps is less than 2 nanometers.

4. The method of claim 1, wherein the raman pump configurations for each of the plurality of raman pumps is a power of the raman pumps measured in milliwatts and the margin of error for the power of the raman pumps is less than 20 milliwatts.

5. The method of claim 1, wherein prior to sending the determined raman pump configuration to each of the plurality of raman pumps of the raman amplifier, the controller is configured to send a signal to the user device requiring a confirmation from a user to send the determined raman pump configurations to each of the plurality of raman pumps of the raman amplifier.

6. A system for configuring a raman amplifier, comprising:
the raman amplifier having a plurality of raman pumps and a controller, the controller having a first processor and a first non-transitory computer readable memory storing instructions;
a user device having a second processor and a second non-transitory computer readable memory storing second instructions that, when executed, cause the user device to accept input from the user of a desired gain profile; and
a network administration device having a third processor and a third non-transitory computer readable memory storing third instructions that when executed cause the third processor to generate a machine learning model using machine learning techniques and deploy the machine learning model to the controller of the raman amplifier where the machine learning model is stored in the first non-transitory computer readable memory of the controller;
wherein generating the machine learning model using machine learning techniques further comprises training a neural network by inputting a plurality of training datasets into the neural network, each of the plurality of training datasets having at least one training gain profile associated with configurations of a plurality of raman pumps configured to achieve the at least one training gain profile, wherein the neural network successively analyzes the plurality of training datasets and adjusts weights of connections between nodes in layers of the neural network to correct outputs until a corrected training output is accurate to with a margin of error when comprared to the configurations of the plurality of raman pumps associated with the at least one training gain profile;

wherein the neural network is a feed-forward neural network, and wherein the layers of the feed-forward neural network comprises four layers of nodes including an input layer, a first hidden layer, a second hidden layer, and an output layer, wherein training the feed-forward neural network comprises assigning a weight to a connection between each of the nodes of the input layer, the first hidden layer, the second hidden layer, and the output layer; and wherein the desired gain profile is communicated from the user device to the controller of the raman amplifier where the first instructions cause the controller to automatically assess the desired gain profile using the machine learning model to determine raman pump configurations for each of the plurality of raman pumps of the raman amplifier and send the determined raman pump configuration to each of the plurality of raman pumps of the raman amplifier.

7. The system of claim 6, wherein the neural network having the corrected training output is a trained neural network and generating the machine learning model using machine learning techniques further comprises:

testing the trained neural network using at least one testing dataset, the at least one testing dataset comprising a testing gain profile as input data and configurations of a plurality of raman pumps configured to obtain the testing gain profile as known output data, the testing comprising inputting the input data of the at least one testing dataset into the trained neural network and comparing a corrected testing output of the trained neural network to the known output data of the at least one testing dataset.

8. The system of claim 6, wherein the raman pump configurations for each of the plurality of raman pumps is a wavelength of the raman pumps measured in nanometers and the margin of error for the wavelength of the raman pumps is less than 2 nanometers.

9. The system of claim 6, wherein the raman pump configurations for each of the plurality of raman pumps is a power of the raman pumps measured in milliwatts and the margin of error for the power of raman pumps is less than 20 milliwatts.

* * * * *